US006453532B1

(12) United States Patent
Maiers et al.

(10) Patent No.: US 6,453,532 B1
(45) Date of Patent: Sep. 24, 2002

(54) APPARATUS FOR ALIGNING PINS ON A PRINTED CIRCUIT BOARD CONNECTOR FOR A DISC DRIVE

(75) Inventors: Michael Alan Maiers, Longmont, CO (US); Robert Terry Haas, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/494,688

(22) Filed: Jan. 31, 2000

Related U.S. Application Data
(60) Provisional application No. 60/137,749, filed on Jun. 4, 1999.

(51) Int. Cl.[7] ............................................... B25B 27/14
(52) U.S. Cl. ......................... 29/281.5; 29/747; 29/759; 29/854; 29/857; 29/826
(58) Field of Search ........................... 29/876, 842, 747, 29/759, 857, 856, 854, 281.5

(56) References Cited

U.S. PATENT DOCUMENTS

| | | | |
|---|---|---|---|
| 3,562,696 A | * | 2/1971 | Barnhart et al. |
| 3,737,998 A | * | 6/1973 | Byrd |
| 3,768,066 A | | 10/1973 | Mattingly, Jr. et al. |
| 4,483,577 A | * | 11/1984 | Novis .......................... 29/857 |
| 4,509,258 A | * | 4/1985 | Locati et al. .................. 29/747 |
| 4,603,929 A | | 8/1986 | Fitzpatrick |
| 4,842,543 A | | 6/1989 | Davis .......................... 439/378 |
| 5,047,898 A | | 9/1991 | Cooke et al. ................ 361/424 |
| 5,129,831 A | | 7/1992 | Locati .......................... 439/79 |
| 5,161,996 A | | 11/1992 | Locati ......................... 439/374 |
| 5,317,480 A | | 5/1994 | Chandraiah et al. ......... 361/785 |
| 5,445,527 A | | 8/1995 | Martin ........................ 439/78 |
| 5,486,118 A | | 1/1996 | Colleran et al. ............ 439/374 |
| 5,755,586 A | | 5/1998 | Knighton et al. ........... 439/328 |
| 5,785,536 A | | 7/1998 | McCartin et al. ............. 439/78 |
| 5,816,842 A | * | 10/1998 | Thantrakul et al. |
| 5,853,297 A | | 12/1998 | Moulton et al. ............ 439/327 |

* cited by examiner

Primary Examiner—Carl J. Arbes
(74) Attorney, Agent, or Firm—Kirstin L. Stoll-DeBell; Merchant & Gould P.C.

(57) ABSTRACT

An apparatus and method of aligning a disc drive printed circuit board connector with a corresponding receptacle in a disc drive slot in a test fixture includes a pair of tapered guide members on opposite ends of the connector which are angled toward the pins of the connector so that the connector is centered within the receptacle as the connector is inserted into the receptacle in the test fixture. The receptacle may be mounted for lateral movement within the slot of the test fixture to move relative to the connector as the guide members slide within the receptacle to align the pins and sockets before the pins enter the sockets within the receptacle.

10 Claims, 3 Drawing Sheets

APPARATUS FOR ALIGNING PINS ON A PRINTED CIRCUIT BOARD CONNECTOR FOR A DISC DRIVE

RELATED APPLICATIONS

This application claims the benefit of priority of U.S. Provisional Patent Application Ser. No. 60/137,749 entitled "METHOD TO ALIGN CONNECTOR TO SYSTEM", filed Jun. 4, 1999.

FIELD OF THE INVENTION

This application relates to magnetic disc drives and more particularly to a connector for a disc drive printed circuit board.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on a hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

The actuator arm is driven by a control signal fed to the voice coil motor (VCM) at the rear end of the actuator arm. A servo system is used to sense the position of the actuator and control the movement of the head above the disc using servo signals read from a disc surface in the disc drive. The servo system relies on servo information stored on the disc. The signals from this information generally indicate the present position of the head with respect to the disc, i.e., the current track position. The servo system uses the sensed information to maintain head position or determine how to optimally move the head to a new position centered above a desired track. The servo system then delivers a control signal to the VCM to rotate the actuator to position the head over a desired new track or maintain the position over the desired current track.

The actuator servo system control components and disc spin motor control components are typically located on a printed circuit (PC) board which is fastened to an underside surface of the disc drive. In addition, input/output signals are fed to and from the disc drive through the printed circuit board. A multiple pin connector typically having a double row of connector pins is mounted to one end of the PC board. This connector fits within a mating socket connector on a ribbon lead or a mating receptacle mounted within a drive bay into which the disc drive is inserted. In particular, for disc drive testing purposes, the drive may be installed into a test device having several drive bays. Each bay has a mating receptacle fastened at one end. A disc drive is slid into the bay and the drive end having the multiple pin connector is pushed in to mate the connector with the receptacle.

One problem that has arisen when conventional disc drive multiple pin connectors are used is that the male pins often become bent out of line and thus the connector cannot be properly mated with the receptacle. This typically occurs because the test bay has larger inside dimensions than the disc drive and thus the connector must be carefully aligned with the receptacle to ensure proper engagement.

SUMMARY OF THE INVENTION

Against this backdrop the present invention has been developed. The present invention comprises an apparatus and method for aligning a plurality of pins on a printed circuit board connector in a disc drive with corresponding pin mating sockets in a test fixture receptacle.

The disc drive has a base plate with a head disc assembly enclosed on one side of the base plate and a generally rectangular printed circuit board attached to another side of the base plate. The printed circuit board is mounted generally in a plane parallel to the base plate and the connector is mounted along one end of the circuit board. The connector has a series of pins projecting from a front face of the connector between opposite connector ends. An elongated guide member is affixed to each of the connector ends. The guide member has a rear edge and a front edge with an outer edge extending from the rear edge to the front edge. At least a portion of the outer edge of the guide member is angled toward the pins in a plane perpendicular to the plane of the circuit board.

A test fixture receptacle is mounted in the test fixture and has a plurality of pin mating sockets between a pair of spaced ends. The spaced ends are adapted to receive the connector guide members therebetween to align the pins with the pin mating sockets before the pins contact the sockets as the disc drive is inserted into the test fixture receptacle.

As the connector end of the disc drive is inserted into a slot in the test fixture, the angled portion of the outer edge of the guide member on the connector contacts an inner edge of a receptacle housing of the test fixture receptacle. This contact causes either the receptacle or the disc drive to move along the guide member to align the pins on the connector with the pin mating sockets in the test fixture receptacle. The pins then are inserted into the pin mating sockets to connect the connector and receptacle together.

These and various other features as well as advantages which characterize the present invention will be apparent from a reading of the following detailed description and a review of the associated drawings.

DETAILED DESCRIPTION

Figure 1:
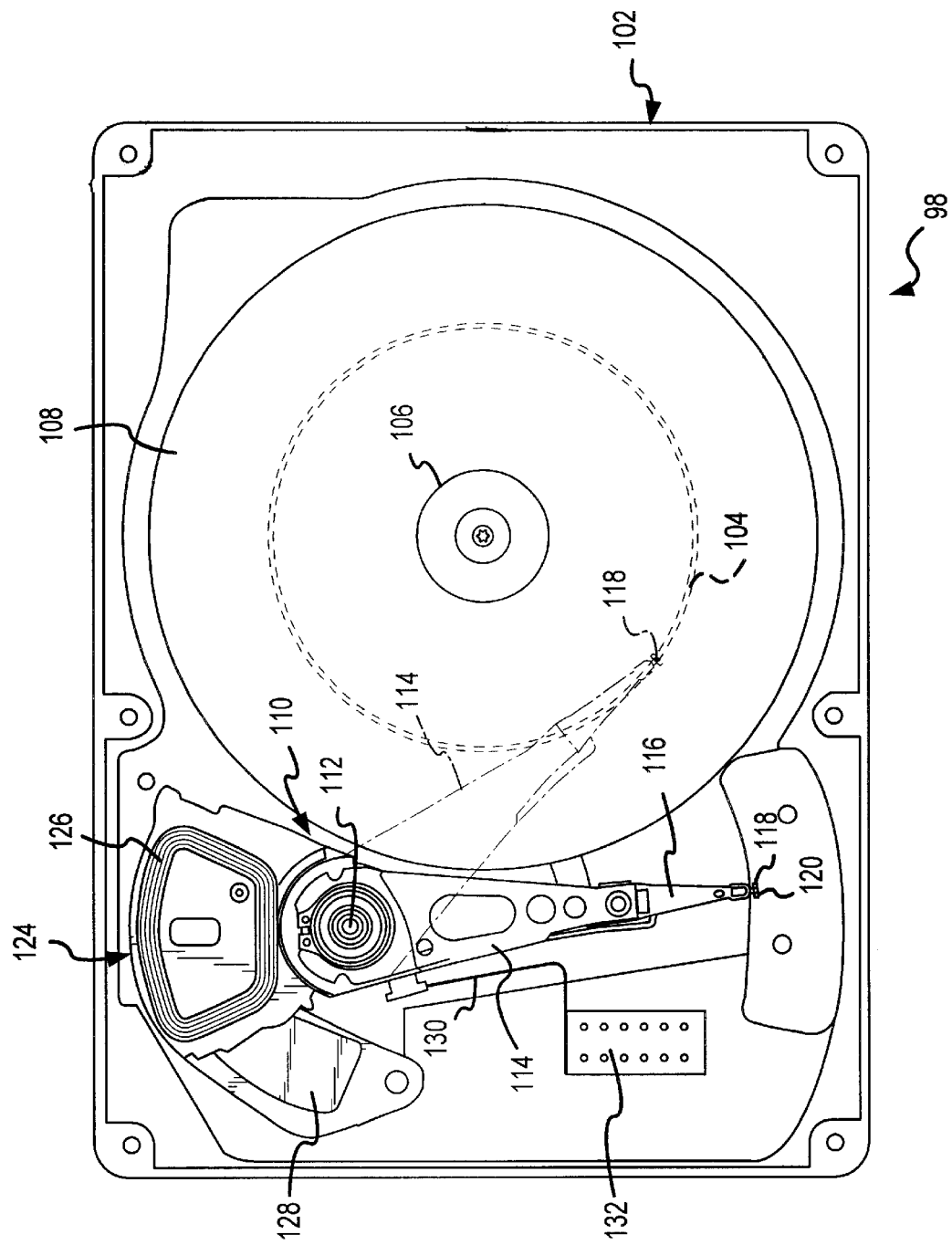
FIG. 1 is a schematic representation of a head disc assembly of a disc drive in accordance with a preferred embodiment of the present invention.

A head disc assembly 98 of a disc drive 100 constructed in accordance with a preferred embodiment of the present invention is shown in FIG. 1. The disc drive 100 includes a base plate 102 to which various components of the disc drive 100 are mounted. A top cover (not shown) cooperates with the base plate 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider 120 enabling the head to fly in close proximity above the corresponding surface of the associated disc 108.

The spindle motor 106 is typically de-energized when the disc drive 100 is not in use for extended periods of time. The heads 118 are moved over park zones near the inner diameter of the discs 108 when the drive motor is de-energized. The radial position of the sliders 120 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the sliders 120 are caused to move across the surfaces of the discs 108.

A flex assembly 130 provides the requisite electrical connection paths for the actuator assembly 110 while allowing pivotal movement of the actuator assembly 110 during operation. The flex assembly includes a flex ribbon circuit 132 to which head wires (not shown) are connected; the head wires being routed along the actuator arms 114 and the flexures 116 to the heads 118 on the sliders 120. The flex ribbon circuit 132 typically includes circuitry for controlling the write currents applied to the heads 118 during a write operation and for amplifying read signals generated by the heads during a read operation. The flex assembly 130 terminates at a flex bracket (not shown) for communication through the base plate 102 to a disc drive printed circuit board (not shown) mounted to the bottom side of the base plate 102.

Figure 2:
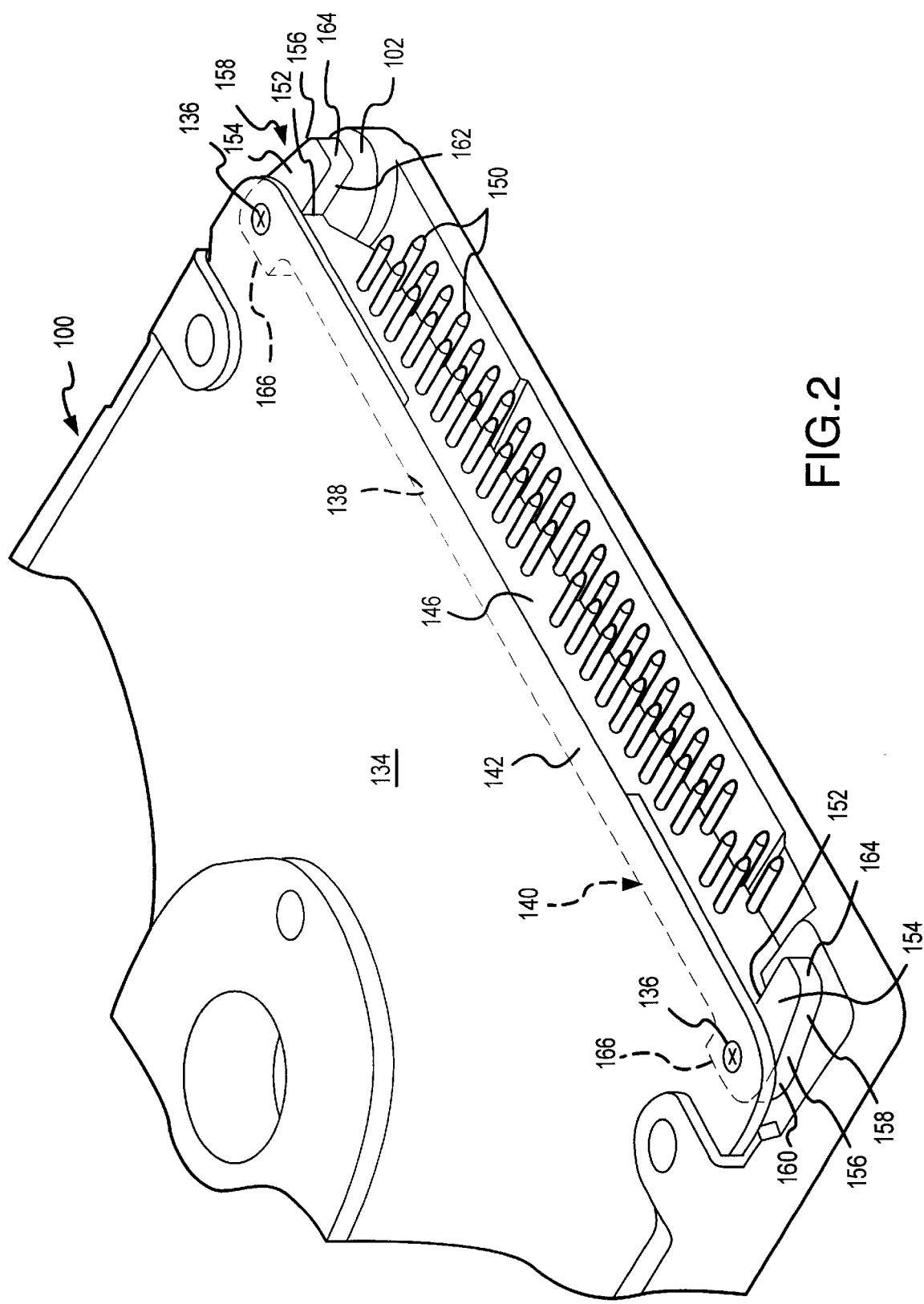
FIG. 2 is a bottom partial perspective view of one end portion of the disc drive with the connector attached to the base plate and the printed circuit board in accordance with a preferred embodiment of the present invention.

FIG. 2 shows a bottom partial perspective view of one end portion of the disc drive 100 having a connector 138 attached to a printed circuit board (PCB) 134 mounted via screws 136 to an opposite side of the base plate 102 from the head disc assembly 98 comprising the actuator assembly 110 and the discs 108. The circuit board 134 is mounted generally in a plane parallel to the base plate 102 with the connector 138 mounted along one end of the circuit board 134. The connector 138 includes a housing 140 with a lower side 142 positioned against one end portion of the PCB 134, an upper side 144 (shown in FIG. 3) positioned against one end portion of the base plate 102, a mating or front face 146, and a rear or solder face 148 (shown with dashed lines) opposite the mating or front face 146. A plurality of pins 150 protrude from the front face 146 and extend through the rear face 148 to lead traces 149 (shown in FIG. 3) on the PCB 134. The housing 140 of the connector 138 has opposite ends 152. A guide member 154 is formed integrally into and extends from each end 152. Alternatively, the guide members 154 may be attached to the housing 140 with welding points, adhesive, or any other conventional attaching means.

The guide members 154 each are elongated members having an outer edge 156, an inner edge 162, a front edge 164, and a rear edge 166. The outer edge 156 extends from the rear edge 166 to the front edge 164 and has a straight portion 160 and an angled portion 158. The angled portion 158 of the outer edge 156 is angled toward the pins 150 in a plane generally perpendicular to the plane of the circuit board 134 such that the distance between the outer edge 156 and the inner edge 162 is narrower at the forward edge 164 than at the rear edge 166. The inner edge 162 extends parallel to the pins 150. The guides 154 extend past the solder or rear face 148. Each guide member 154 has a screw aperture 168 next to the rear edge 166 of the guide member 154 and the straight portion 160 of the outer edge 156 of the guide member 154.

Figure 3:
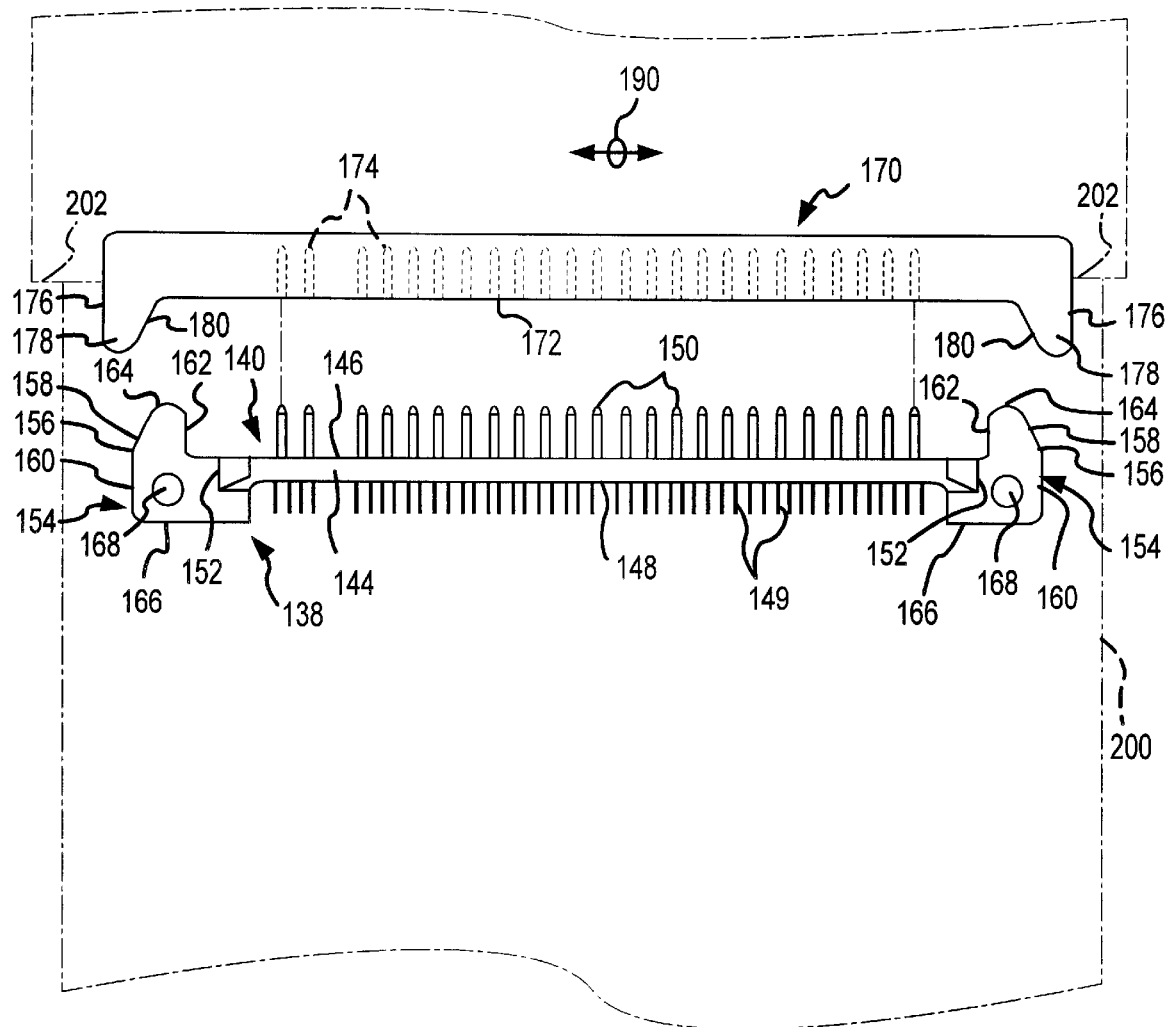
FIG. 3 is a top plan view of the connector shown in FIG. 2 aligned to connect with a receptacle housing in accordance with a preferred embodiment of the present invention.

FIG. 3 is a schematic plan view of the connector 138 aligned for insertion into a receptacle 170 of a test fixture (not shown). The test fixture receptacle 170 has a slot 200 (shown with dashed lines) for insertion of the disc drive 100 and the receptacle housing 170 is attached to an end wall 202 (shown with dashed lines) of the test fixture receptacle. The receptacle housing 170 has a mating side 172 with a plurality of pin mating sockets 174 corresponding to the pins 150 on the connector 138. The receptacle housing 170 has two opposite ends 176; a guide tab 178 is affixed to each end 176. The guide tabs 178 each have an inner guide edge portion 180 which is angled away from the pin mating sockets 168 at an angle corresponding, such as, parallel to the angle of the portion 158 of the mating connector 138.

As the disc drive 100 is inserted into the slot 200 of the test fixture such that the connector end is inserted first, the edges 164 of the guide members 154 first contact the guide tabs 178. As the disc drive 100 is inserted further into the slot 200 of the test fixture, the outer edges 156 of the guide members 154 slide along the inner edges 180 of the guide tabs 178 to center the housing 140 of the connector 138 into the receptacle 170 such that the pins 150 align with the mating sockets 174. The disc drive 100 is fully inserted into the test fixture receptacle when the pins 150 are fully inserted into the mating sockets 174.

The slot 200 may be wide enough to permit the disc drive 100 to be moved laterally sufficiently to align the connector 138 with the receptacle 170. Alternatively, the receptacle 170 may be mounted for lateral movement such that the receptacle 170 may move back and forth as indicated by directions arrow 190 in FIG. 3 to align the connector 138 and the receptacle 170 for mating engagement. In either case, the guide member 154 insures proper axial pin and socket alignment prior to the pins 150 and sockets 174 coming together. This ensures that the pins 150 will properly mate into sockets 174 without deformation or damage to the pins 150.

The receptacle 170 may not have angled guide edges 180 because the presence of the tapered or angled guide members 154 on the connector alone are sufficient to ensure proper alignment of the pins 150 with the sockets 172. However, the angled edges 180 are preferred in order to ensure smooth engagement between the connector 138 and receptacle 170.

In summary, the present invention preferably is an apparatus for aligning a plurality of pins (such as 150) on a connector (such as 138) in a disc drive (such as 100) with corresponding pin mating sockets (such as 174) in a test fixture receptacle (such as 170). The disc drive (such as 100) has a base plate (such as 102) with a head disc assembly (such as 98) enclosed on one side of the base plate (such as 102) and a generally rectangular printed circuit board (such as 134) attached to another side of the base plate (such as 102). The circuit board (such as 134) is mounted in a plane generally parallel to the base plate (such as 102) and the connector (such as 138) is mounted along one end of the circuit board (such as 134). The connector (such as 138) has a series of pins (such as 150) projecting from a front face (such as 146) of the connector (such as 138) between opposite connector ends (such as 152).

An elongated guide member (such as 154) is affixed to one of the connector ends (such as 152) and has an outer edge (such as 156) extending from a rear edge (such as 166) to a front edge (such as 164). At least a portion (such as 158) of the outer edge (such as 156) is angled toward the pins (such as 150) in a plane perpendicular to the plane of the circuit board (such as 134). The outer edge (such as 156) and the front edge (such as 164) of the guide member (such as 154) join together in a curve. A second guide member (such as 154) may be affixed to the other end (such as 152) of the connector (such as 138)

A plurality of pin mating sockets (such as 174) are included between a pair of spaced ends (such as 176) on the test fixture receptacle (such as 170). The ends (such as 176) are adapted to receive the connector guide member (such as 154) therebetween to align the pins (such as 150) with the pin mating sockets (such as 174) before the pins (such as 150) contact the sockets (such as 174) as the disc drive (such as 100) is inserted into the test fixture receptacle (such as 170). At least one receptacle end (such as 176) has an inner guide edge portion (such as 180) extending in a plane parallel to the angled outer edge portion (such as 156) of the mating connector guide member (such as 138) so as to guide the connector (such as 138) into pin and socket alignment as the connector (such as 138) is inserted into the receptacle (such as 170). The receptacle (such as 170) may be mounted in the test fixture for side to side movement (such as 190) so as to align itself to the guide members (such as 154) on the connector (such as 138) as the disc drive (such as 100) is inserted into the test fixture receptacle (such as 170).

The connector (such as 138) has a housing (such as 140) with a lower side (such as 142) positioned against one end portion of the printed circuit board (such as 134), an upper side (such as 144) positioned against one end portion of the base plate (such as 102), a front face (such as 146) through which the pins (such as 150) protrude, a rear face (such as 148) opposite the front face (such as 146), and two opposite ends (such as 152). One or more guide members (such as 154) extend rearward from ends (such as 152) of the housing (such as 140) beyond the rear face (such as 148) of the housing (such as 140).

A method for aligning the connector (such as 138) with the corresponding test fixture receptacle (such as 170) is as follows. The disc drive (such as 100) is inserted into a slot (such as 200) in the test fixture such that the connector end (such as 138) is inserted first. The angled portion (such as 158) of the outer edge (such as 156) of the guide member (such as 154) on one end of the connector (such as 138) is contacted with the inner edge (such as 180) of the test fixture receptacle (such as 170). One of the receptacle (such as 170) or the disc drive (such as 100) is moved along the angled portion (such as 158) of the guide member (such as 154) to align the pins (such as 150) on the connector (such as 138) with the pin mating sockets (such as 174) in the test fixture receptacle (such as 170). The pins (such as 150) are then inserted into the pin mating sockets (such as 174) to connect the connector (such as 138) and receptacle (such as 170) together. The receptacle (such as 170) may be moved laterally (such as 190) to align the pins (such as 150) and the sockets (such as 174) as the guide member (such as 154) on the connector (such as 138) is inserted within the receptacle (such as 170) before the pins (such as 150) mate with the sockets (such as 174).

The connector (such as 138) may have a pair of guide members (such as 154) on its opposite ends (such as 152). As the disc drive (such as 100) is moved toward the receptacle (such as 170) in the slot (such as 200), the connector guide members (such as 154) are slid between and along the inner edges (such as 180) of the receptacle (such as 170) to progressively align the pins (such as 150) with the mating sockets (such as 174) as the connector (such as 138) is inserted within the receptacle (such as 170).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, the connector may employ only one guide to cooperate with one guide tab on the receptacle housing to align the connector and receptacle housing. Or the test-fixture may include angled guide members similar to the guide members on the connector in the aforementioned preferred embodiment and the connector may include guide tabs which correspond to the guide members on the test-fixture. Accordingly, all such modifications, changes and alternatives are encompassed in the spirit of the invention disclosed and as defined in the appended claims.

What is claimed is:

1. An apparatus for aligning a plurality of pins on a printed circuit board connector in a disc drive with corresponding pin mating sockets in a test fixture receptacle, the disc drive having a base plate with a head disc assembly enclosed on one side of the baseplate and a generally rectangular printed circuit board attached to another side of the baseplate, the circuit board is mounted in a plane generally parallel to the baseplate with the connector mounted along one end of the circuit board, wherein the connector has a series of pins projecting from a front face of the connector between opposite connector ends, the apparatus comprising:

an elongated guide member affixed to one of the connector ends, the guide member having an outer edge extending from a rear edge to a front edge with at least a portion of the outer edge angled toward the pins in a plane perpendicular to the plane of the circuit board.

2. The apparatus according to claim 1 wherein the outer edge and the front edge of the guide member joins together in a curve.

3. The apparatus according to claim 1 further comprising:
a second guide member affixed to the other end of the connector having an outer edge extending from a rear edge to a front edge with at least a portion of the outer edge angled toward the pins in a plane perpendicular to the plane of the circuit board.

4. The apparatus according to claim 1 further comprising a plurality of pin mating sockets between a pair of spaced ends on the test fixture receptacle, the ends being adapted to receive the connector guide member therebetween to align the pins with the pin mating sockets before the pins contact the sockets as the disc drive is inserted into the test fixture receptacle.

5. The apparatus according to claim 4 wherein one receptacle end has an inner guide edge portion extending in a plane parallel to the angled outer edge portion of a mating connector guide member so as to guide the connector into pin and socket alignment as the connector is inserted into the receptacle.

6. The apparatus according to claim 3 wherein the receptacle is mounted in the test fixture for side to side movement so as to align itself to the guide members on the connector as the disc drive is inserted into the test fixture receptacle.

7. The apparatus according to claim 1 wherein the connector has a housing with a lower side positioned against one end portion of the printed circuit board, an upper side positioned against one end portion of the base plate, a front face through which the pins protrude, a rear face opposite the front face, and two opposite ends wherein the guide member extends from one end of the housing.

8. The apparatus according to claim 7 further including:
a second guide member extending from the other end of the housing.

9. The apparatus according to claim 8 wherein:
the guide members are formed integrally with each end of the housing.

10. The apparatus according to claim 7 wherein the guide members each extend rearward beyond the rear face of the housing.

* * * * *